US009215380B2

(12) United States Patent
Shigemasa et al.

(10) Patent No.: US 9,215,380 B2
(45) Date of Patent: Dec. 15, 2015

(54) INFORMATION PROCESSOR, INFORMATION PROCESSING METHOD, AND COMPUTER PROGRAM PRODUCT

(71) Applicants: Tsuyoshi Shigemasa, Tokyo (JP); Kiyoshi Kasatani, Kanagawa (JP)

(72) Inventors: Tsuyoshi Shigemasa, Tokyo (JP); Kiyoshi Kasatani, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 122 days.

(21) Appl. No.: 13/893,602

(22) Filed: May 14, 2013

(65) Prior Publication Data

US 2013/0308055 A1 Nov. 21, 2013

(30) Foreign Application Priority Data

May 18, 2012 (JP) ................................. 2012-114101

(51) Int. Cl.
*H04N 5/262* (2006.01)
*H04N 7/14* (2006.01)
*H04N 7/15* (2006.01)

(52) U.S. Cl.
CPC ............... *H04N 5/262* (2013.01); *H04N 7/142* (2013.01); *H04N 7/152* (2013.01)

(58) Field of Classification Search
USPC ............ 348/14.02, 14.03, 14.08–14.1, 14.12, 348/563
See application file for complete search history.

(56) References Cited

U.S. PATENT DOCUMENTS

| | | | |
|---|---|---|---|
| 6,151,079 A * | 11/2000 | Nagata et al. ................. | 348/581 |
| 2007/0294263 A1 | 12/2007 | Punj et al. | |
| 2010/0138780 A1 * | 6/2010 | Marano et al. ................ | 715/804 |
| 2010/0199340 A1 * | 8/2010 | Jonas et al. ........................ | 726/8 |
| 2011/0222676 A1 * | 9/2011 | Okada et al. ................ | 379/93.21 |
| 2011/0283314 A1 * | 11/2011 | Tang et al. ....................... | 725/37 |
| 2012/0086769 A1 | 4/2012 | Huber et al. | |
| 2012/0274733 A1 * | 11/2012 | Yano .......................... | 348/14.08 |
| 2012/0299846 A1 * | 11/2012 | Matsuda ...................... | 345/173 |

FOREIGN PATENT DOCUMENTS

JP     2008-061220     3/2008

* cited by examiner

*Primary Examiner* — Joseph J Nguyen

(74) *Attorney, Agent, or Firm* — Oblon, McClelland, Maier & Neustadt, L.L.P.

(57) ABSTRACT

An information processor includes: a storage unit that stores therein output control information used for setting an output environment of an external output device; a detecting unit that acquires information indicating the output environment of the external output device; a first control unit that determines the output environment acquired by the detecting unit by referring to the output control information stored in the storage unit; and a second control unit that operates the external output device in accordance with the output environment determined by the first control unit.

7 Claims, 8 Drawing Sheets

FIG.4

<DISPLAY CONVERSION TABLE> 400

| RESOLUTION | UI COMPONENTS | LAYOUT | BAND | |
|---|---|---|---|---|
| SVGA (800*600) | UI 1 | LAYOUT 1 | 512 kbps | 401 / 402 |
| WSVGA (1024*600) | UI 2 | LAYOUT 2 | 832 kbps | 403 |
| XGA (1024*768) | UI 3 | LAYOUT 2 | 832 kbps | 404 |
| SXGA (1280*1024) | UI 4 | LAYOUT 3 | 1024 kbps | 405 |

| LAYOUT DEFINITION (501) | SCREEN DIVISION ATTRIBUTES (502) | REFERENCE COORDINATES AND XY DOT OFFSETS (503) | UI COMPONENT SET IDENTIFICATION VALUE (504) | | | | |
|---|---|---|---|---|---|---|---|
| | | | SVGA | WSVGA | XGA | SXGA | |
| LAYOUT 1 | MAIN SCREEN | SET 1 | UI 1 | ... | ... | ... | 505 |
| | SUB SCREEN | SET 2 | | | | | |
| | SUB SCREEN | SET 3 | | | | | |
| | SUB SCREEN | SET 4 | | | | | |
| LAYOUT 2 | EVEN | SET 5 | ... | UI 2 | UI 3 | ... | 506 |
| | EVEN | SET 6 | | | | | |
| | EVEN | SET 7 | | | | | |
| | EVEN | SET 8 | | | | | |
| LAYOUT 3 | SINGLE SCREEN | SET 9 | | | | UI 4 | 507 |
| ⋮ | ⋮ | ⋮ | ⋮ | ⋮ | ⋮ | ⋮ | |

INFORMATION PROCESSOR, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2012-114101 filed in Japan on May 18, 2012.

BACKGROUND OF THE INVENTION

1. Field of the Invention

The present invention relates to a technology for controlling an output environment of an external output control device, and more particularly to an information processor, an information processing method, and a computer program product to automatically control an output environment of a video device and an audio device externally connected.

2. Description of the Related Art

Conventionally, to reproduce and output video to a monitoring device, a user has set resolution suitable for an image output device, such as a projector and a monitoring device, and output the video to the monitoring device. Furthermore, there have been developed monitoring devices that automatically set resolution correspondingly to an image output device and output an image while saving the user the trouble of setting the resolution.

If the user specifies the resolution for output of an image as in the conventional technology, however, the capacity of an output device that outputs video and audio may not possibly be fully exercised. Furthermore, even in the system that automatically determines the resolution, the resolution of the output device may possibly reduce the video size excessively, thereby making it hard to see the video. In a video conference, sound multiplex broadcasting, and digital terrestrial broadcasting, for example, images supplied from a plurality of sources may be displayed on a single monitor screen by dividing the monitor screen. In such a case, if the resolution is not adjusted correspondingly to the division of the monitor screen, the images displayed on the monitor screen may not possibly be displayed properly.

If an audio output monitoring device supporting an audio-visual (AV) data reproduction protocol, such as high-definition multimedia interface (HDMI), is used, for example, a change in relative positions of a speaker and a microphone may possibly cause feedback. Conventionally, there have been developed technologies for addressing the problems described above. Japanese Patent Application Laid-open No. 2008-61220, for example, discloses a technology for controlling a phone conference system with hundreds of participants. The phone conference system includes a plurality of nodes that communicate with one another to establish a conference. Each node includes a video display having a display layout, and at least one of the nodes controls the display layout of each node in the conference at least partially and individually in a specific format that can be unique to each node.

The technology disclosed in Japanese Patent Application Laid-open No. 2008-61220 is a technology for controlling the display layout of video displayed on the video display in the phone conference system in the format unique to each node. The technology disclosed in Japanese Patent Application Laid-open No. 2008-61220, however, does not intend to appropriately display moving images or video supplied from other nodes on a plurality of respective display areas while automatically optimizing the capacity of a monitoring device.

Furthermore, the technology disclosed in Japanese Patent Application Laid-open No. 2008-61220 does not intend to output video transmitted from independent nodes on a plurality of respective areas on a monitor screen without putting a burden on the eyes and ears of the user.

SUMMARY OF THE INVENTION

In view of the above, there is a need to provide an information processor, an information processing method, and a computer program product that makes it possible to perform output while fully exercising the capacity of an output device without putting a burden on the eyes and ears of a user.

SUMMARY OF THE INVENTION

It is an object of the present invention to at least partially solve the problems in the conventional technology.

An information processor includes: a storage unit that stores therein output control information used for setting an output environment of an external output device; a detecting unit that acquires information indicating the output environment of the external output device; a first control unit that determines the output environment acquired by the detecting unit by referring to the output control information stored in the storage unit; and a second control unit that operates the external output device in accordance with the output environment determined by the first control unit.

A computer program product includes a non-transitory computer-usable medium having computer-readable program codes embodied in the medium. The program codes when executed cause a computer to function as: a detecting unit that acquires information indicating an output environment of an external output device; a first control unit that determines the output environment acquired by the detecting unit by referring to output control information stored in a storage unit that stores therein the output control information used for setting the output environment of the external output device; and a second control unit that operates the external output device in accordance with the output environment determined by the first control unit.

An information processing method is to operate an external output device in accordance with an output environment other than a default setting of an information processor. The information processing method causes the information processor to perform: acquiring information indicating the output environment of the external output device; determining the output environment acquired at the acquiring by referring to a storage unit that stores therein output control information used for setting the output environment of the external output device; and operating the external output device in accordance with the determined output environment.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
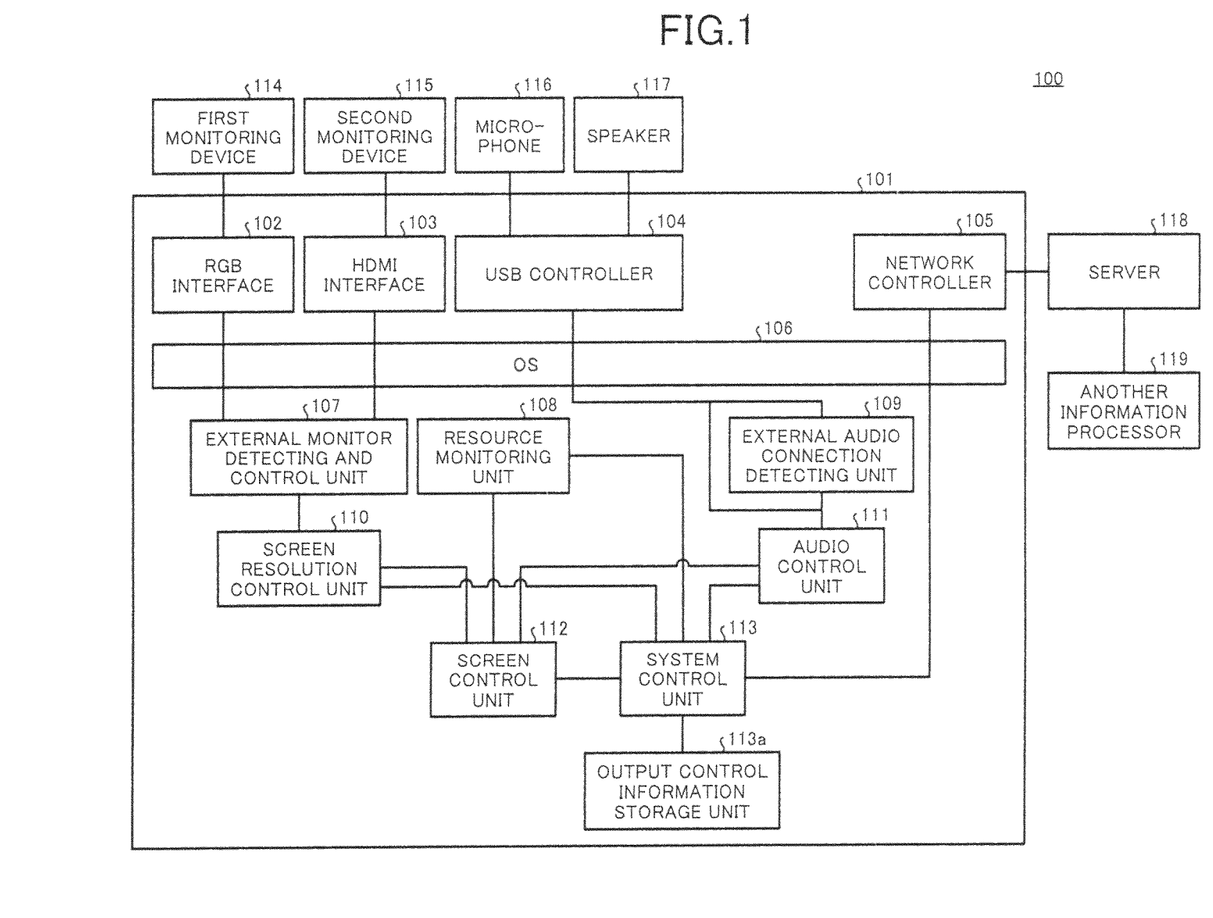
FIG. 1 is a functional block diagram of a video conference system serving as an example of an information processing system 100 according to an embodiment of the present invention.

While exemplary embodiments according to the present invention are described below, the present invention is not limited to the embodiments. FIG. 1 is a functional block diagram of a video conference system serving as an example of an information processing system 100 according to an embodiment of the present invention. The information processing system 100 includes an information processor 101 and a server 118. The information processor 101 is placed at a site of a participant in a video conference. The server 118 processes various types of data transmitted from the information processor 101 and transmits the various types of processed data to another information processor 119 placed at a site of another participant.

More specifically, the information processor 101 controls operations of various external input-output devices and includes a red-green-blue (RGB) interface 102, a high-definition multimedia interface (HDMI) interface 103, and a universal serial bus (USB) controller 104 as input-output control units. In the present embodiment, the RGB interface 102 is mounted on the information processor 101 by default and is used to drive a liquid crystal display (LCD) illustrated as a first monitoring device 114 in FIG. 1. The HDMI interface 103 is used to drive a second monitoring device 115. The second monitoring device 115 is mounted as an externally connected large monitor so as to allow all the attendees at a specific site to share the contents of the video conference. In another embodiment, interfaces may be mounted additionally or alternatively for formats, such as extended graphics array (XGA) and super extended graphics array (SXGA), instead of the RGB interface 102 and the HDMI interface 103.

The USB controller 104 transmits and receives data to and from a microphone 116 and a speaker 117. The microphone 116 can acquire audio of a participant at the specific site and transmit the audio to the information processor 119 at another site via the server 118. By contrast, the speaker 117 receives audio data acquired at another site via the server 118 and allows the sites at each of which the information processor 101 is placed, to share the audio data. The microphone 116 and the speaker 117 are mounted as external devices separately from a built-in speaker and a built-in microphone integrally mounted on the information processor 101.

A network controller 105 performs data communications between the information processor 101 and the information processor 119 at another site via the server 118. The network controller 105 uses a communication protocol, such as Ethernet (registered trademark) and Institute of Electrical and Electronics Engineers (IEEE) 802.11, and can perform communications in accordance with a network protocol, such as TCP/IP and UDP/IP, for example.

The information processor 101 further includes an external monitor detecting and control unit 107, a resource monitoring unit 108, and an external audio connection detecting unit 109. The external monitor detecting and control unit 107 detects whether an external monitor, such as the second monitoring device 115, is connected based on a plug-in and play protocol, for example, and can control output of an image according to the present embodiment. The resource monitoring unit 108 monitors usage of a central processing unit (CPU) that enables a system control unit 113 to perform control, for example, and monitors memory usage. Thus, the resource monitoring unit 108 performs control so as to prevent the information processor 101 from causing a system failure and malfunction of an application due to capacity shortage of resources.

The external audio connection detecting unit 109 detects whether an externally connected speaker, such as the speaker 117, is present and can control output of audio according to the present embodiment. The information processor 101 further includes a screen resolution control unit 110, an audio control unit 111, a screen control unit 112, and the system control unit 113.

The screen resolution control unit 110 receives a result of detection made by the external monitor detecting and control unit 107 to determine resolution information of the external monitor. The screen resolution control unit 110 then transmits the resolution information to the system control unit 113. The system control unit 113 uses the resolution information of the received external monitor to generate image information to be output to the external monitor according to the present embodiment. The system control unit 113 then transmits the result to the screen control unit 112. The screen control unit 112 transmits the received image information to the screen resolution control unit 110. The external monitor detecting and control unit 107 drives the RGB interface 102 or the HDMI interface 103 via an operating system (OS) 106 in response to a command issued from the screen resolution control unit 110, thereby driving the first monitoring device 114 or the second monitoring device 115 corresponding thereto, respectively. The screen control method according to the present embodiment can achieve preferable display at the specific site regardless of the screen resolution of the externally connected monitoring device without causing a lack of an edge of video or displaying the video in an excessively small size even if the video is reproduced in different screen sizes for respective sites.

The term "monitoring device" in the present embodiment means a video device that can display digital image data in an RGB color space, such as a video projector and a liquid crystal projector that project and display graphics to be formed on a screen besides a device that displays the graphics directly on the screen, such as an LCD display, an organic electroluminescence (EL) display, and a plasma display.

If the external audio connection detecting unit 109 detects that an external speaker and a microphone are connected, the external audio connection detecting unit 109 acquires specs and product names thereof, for example, and transmits device names to the audio control unit 111. The audio control unit 111 transmits the specs and the received product names to the system control unit 113. The system control unit 113 uses the acquired device names to determine an input-output level of an audio device, such as the externally connected speaker. The system control unit 113 then notifies the audio control unit 111 of the determined input-output level.

The audio control unit 111 receives the determined input-output level to control an output level and controls the input-output level of the audio devices, such as the microphone 116 and the speaker 117, via the OS 106 and the USB controller 104.

To perform control relating to the screen resolution and the audio environment, the information processor 101 stores output control information in an output control information storage unit 113a formed of a non-volatile memory, such as a non-volatile random access memory (NVRAM), an electrically erasable programmable read-only memory (EEPROM), an EPROM, and flash memory. If an externally connected output device is detected, the system control unit 113 refers to the output control information to control the screen resolution control unit 110 and the audio control unit 111. Thus, the system control unit 113 can output video and audio in a desired graphics environment and a desired audio environment, respectively.

A well-known processor of Pentium series (registered trademark), Xeon series (registered trademark), Athron series (registered trademark), and PowerPC series (registered trademark) can be used as the system control unit 113. The configuration of the processor may be single-core or multi-core. An appropriate OS may be selected and mounted as the OS 106, such as Unix (registered trademark), Linix (registered trademark), Windows (registered trademark) series, and MAC OS (registered trademark).

The audio control method according to the present embodiment can reproduce audio at an appropriate level even if different types of audio devices are externally connected at the respective sites to share information.

Figure 2:
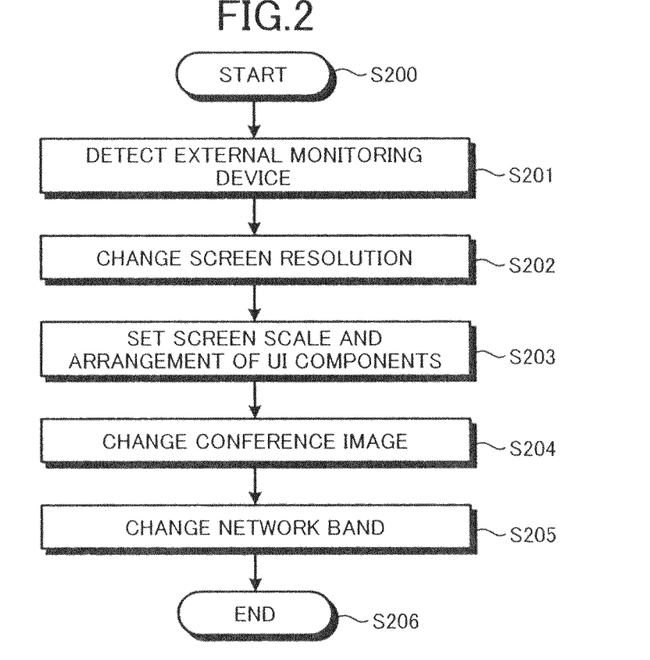
FIG. 2 is a schematic flowchart of a screen control method according to the present embodiment.

FIG. 2 is a schematic flowchart of the screen control method according to the present embodiment. The processing illustrated in FIG. 2 is started at Step S200. The external monitor detecting and control unit 107 detects connection of an external monitoring device at Step S201. If the external monitor detecting and control unit 107 does not detect connection of an external monitoring device, settings of a default device mounted on the information processor 101 are used to perform the subsequent processing.

The screen resolution control unit 110 receives the resolution and the product name of the external monitoring device detected by the external monitor detecting and control unit 107 and notifies the system control unit 113 of the information at Step S202. Subsequently, the screen resolution control unit 110 acquires screen resolution and screen configuration information to be applied from the system control unit 113. The screen resolution control unit 110 then changes a screen scale using the received screen resolution and the received screen configuration information (hereinafter, referred to as user interface (UI) components) and sets the arrangement of the UI components correspondingly thereto at Step S203.

Furthermore, the external monitor detecting and control unit 107 acquires the screen scale and arrangement information of the UI components from the screen resolution control unit 110 at Step S203. The external monitor detecting and control unit 107 then uses each piece of acquired information to change an image of a conference held remotely at a plurality of sites with a screen layout of the acquired scale and the acquired arrangement of the UI components on the externally connected monitoring device, such as the second monitoring device 115 at Step S204. In association with this, the external monitor detecting and control unit 107 optimizes and modifies a network bandwidth to display an appropriate moving image at Step S205. Subsequently, the processing is terminated at Step S206.

Performing the processing of FIG. 2 makes it possible to display an appropriate moving image regardless of the number of sites for which the image of the conference being held among a plurality of sites is to be displayed and of the specs of the externally connected monitoring device.

Figure 3:
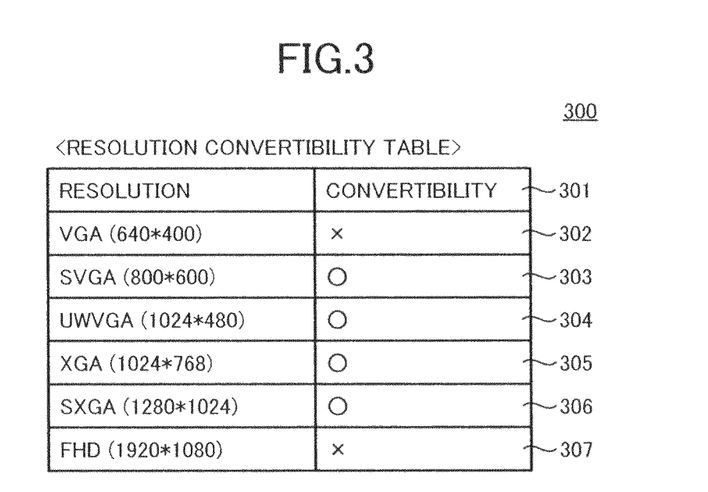
FIG. 3 is a schematic of a resolution convertibility table 300 managed by a system control unit 113 as output control information so as to perform control relating to screen resolution.

FIG. 3 is a schematic of a resolution convertibility table 300 managed by the system control unit 113 as output control information so as to perform control relating to the screen resolution. The resolution convertibility table 300 stores therein convertibility flags indicating whether to permit conversion in a manner associated with graphics resolution of the monitoring device that can be detected. If the external monitoring device supports the resolution of video graphics array (VGA) (640×400) alone, for example, the resolution cannot be converted into resolution other than VGA. Therefore, "a cross" is set as the convertibility flag. In the case of a full high definition (FHD) format, it is indicated that the resolution cannot be converted in FIG. 3. However, if the information processor 101 can be provided with a high-performance graphics processor separately, for example, "a circle" can be set as the convertibility flag.

By contrast, formats of SXGA, XGA, ultra-wide VGA (UVVGA), and super VGA (SVGA) are downward compatible by default settings in the information processor 101 according to the present embodiment. It is indicated that an image in the format of UVVGA (1024×480) can be converted into and displayed as an image in the format of SVGA (800×600). Furthermore, the present embodiment can generally convert a graphics format having downward compatibility into a format within a range that can be supported by a graphics function.

An assumption is made that a plurality of images are displayed by dividing a single screen into a plurality of sub screens as in the present embodiment when performing resolution conversion in accordance with the resolution convertibility table 300 illustrated in FIG. 3. In this case, if the images are generated simply by using the UI components without any change, a lack of the edges, protrusion of the images, and other problems occur, thereby preventing excellent reproduction of the images. Furthermore, in association with conversion of the graphics format, it is necessary to change the buffering speed for streaming the images, that is, the network bandwidth.

Figure 4:
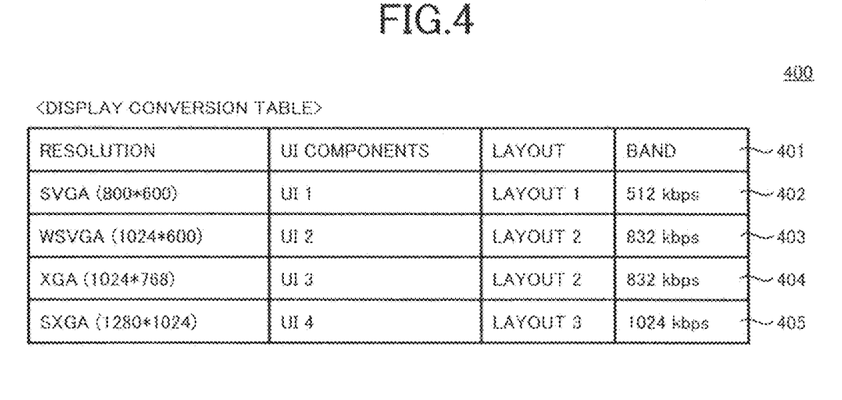
FIG. 4 is a schematic of a display conversion table 400 serving as an implemented example of the output control information used for displaying images, such as a main image and a sub image, by appropriately allocating respective display screens of an external monitoring device thereto when performing resolution conversion according to the present embodiment.

FIG. 4 is a schematic of a display conversion table 400 serving as an implemented example of the output control information used for displaying images, such as a main image and a sub image, by appropriately allocating respective display screens of the external monitoring device thereto when performing resolution conversion according to the present embodiment. In the display conversion table 400, resolution, UI components, layouts, and bandwidths corresponding to these elements each form a column. These setting conditions used for each resolution are registered as records.

If the resolution obtained after the conversion is SVGA (800×600), for example, a UI set to which various attribute values used as the UI components are registered; a screen layout identification value serving as a layout setting for setting how to allocate the display areas of the externally connected monitoring device to the main screen and the sub screen; and a network bandwidth to be minimally ensured of 512 kbps are specified.

The UI components in the present embodiment mean object attributes constituting a graphical user interface (GUI), such as a character font, a button of the GUI to be used, a scroll bar, a list box, a text field, a graphics window, a slider, and a combo box. The term "layout" in the present embodiment means allocation information indicating how to arrange and display a plurality of screens to be displayed on a monitoring device at a single site when multipoint connection is established for a video conference.

The term "band" in the present embodiment means a network band. The network band means a data rate (kbps) used for transmitting video, audio, and other data via a network in a video conference.

The screens to be displayed can display respective images of all the sites participating in the conference in the same size. Alternatively, an image of a site attracting much attention may be displayed as the main screen with a larger area, whereas images of the other sites may be displayed as the sub images with a smaller area. In another embodiment, an image of a site attracting much attention may be displayed full-screen in response to a command issued by the user or an operation performed by the user.

Referring back to FIG. 4, if the resolution is the graphics format of VGA (800×600), the UI components are associated with a record 402. In addition, it is specified that a UI 1, a layout 1, and a band of 512 kbps are to be used. If the resolution is the graphics format of wide-SVGA (WSVGA) (1024×600), it is specified in a record 403 that a UI 2 is to be used as the UI components, that a layout 2 is to be used as the layout of the screen, and that 832 kbps is to be used as the band.

By contrast, if the resolution obtained by the conversion is the graphics format of XGA (1024×768), it is specified in a record 404 that a set referred to as a UI 3 is used as the UI components and that a layout 2 is to be used. This is because the graphics formats of XGA and WSVGA are compatible with each other simply by modifying the set of UI objects in the longitudinal direction. In this regard, if the resolution is the graphics format of SXGA (1280×1024), it is specified in a record 405 that a UI 4, which is another set of UI components, is to be used, that a layout 3, which is another screen layout, is to be used, and that 1024 kbps is to be used as the band.

In the present embodiment, the size of an area in which an image is to be displayed is changed in association with conversion of the screen resolution. To prevent clear recognition of the change, a menu bar and a task bar are arranged at the upper and lower parts of the screen, for example. Thus, the UI components are arranged so as to prevent the user from recognizing the display discontinuity.

Figure 5:
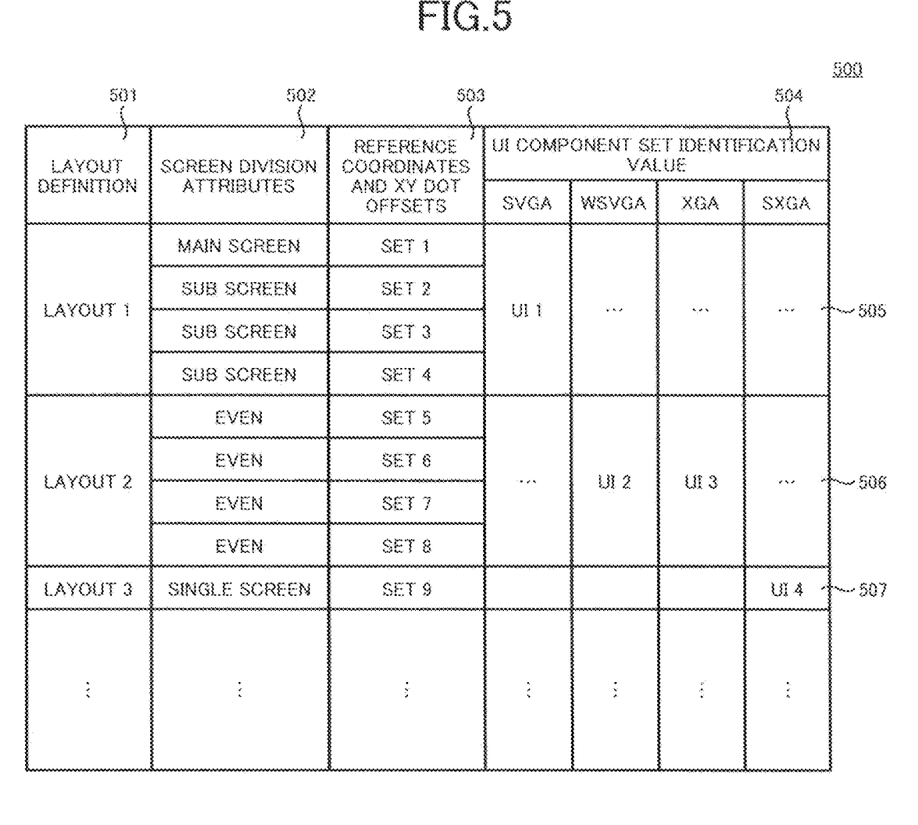
FIG. 5 is a schematic of a layout definition table 500 serving as a layout defining unit that forms the output control information and specifically exemplifies the relation among layouts of a screen, UI components, and graphics formats assuming that a conference is held among four remote sites according to the present embodiment.

FIG. 5 is a schematic of a layout definition table 500 serving as a layout defining unit that forms the output control information and specifically exemplifies the relation among layouts of the screen, UI components, and graphics formats assuming that a conference is held among four remote sites according to the present embodiment. The layout definition table 500 illustrated in FIG. 5 is managed by the system control unit 113 and can be mounted on the information processor 101 as firmware stored in the appropriate non-volatile memory 113a, for example.

The layout 1 in a column 501 specifies that the screen is to be divided into one main screen and three sub screens as indicated by a screen division attribute in a column 502. Furthermore, screen allocation attributes employed in this case are defined as a set 1 to a set 4 in a column 503 based on a format using reference coordinates of each screen and XY dot offsets, for example. The method of screen allocation may be realized by allocation using absolute values on the screen besides by definition using relative offsets. The method can be set as appropriate depending on specific usage and the implemented system. In the layout 1, the same screen attribute can be allocated to the sub screens except for the values of reference coordinates. In this case, the same value may be used for the set 2, the set 3, and the set 4.

If the screen resolution is specified to be SVGA in the layout 1, it is indicated in a column 504 that the UI 1 is to be used as the UI components. These parameters are registered in a manner associated with one another as a record 505 for the case where the graphics format is SVGA in the layout 1.

By contrast, the layout 2 has a screen configuration in which all the four sites are evenly allocated on the monitoring device unlike the layout 1. In this case, if the graphics format obtained by conversion is WSVGA, the UI 2 is to be used as the UI components. If the graphics format obtained by conversion is XGA, the UI 3 is to be used as the UI components. The UI 2 or the UI 3 can be used in the layout 2 because WSVGA and XGA can form an image providing no feeling of strangeness simply by changing the settings of the UI components as described with reference to FIG. 4. Furthermore, the screen allocation attributes employed in this case are defined as a set 5, and sets 6 and 7 for the sub screens in the column 503. In this case, the reference coordinates of an image of a single site is different, but the same value is registered as the XY dot offsets.

As illustrated in FIG. 5, the layout 3 has a screen configuration in which only an image of a site attracting much attention is displayed full-screen. In this case, only the main screen is allocated on the monitoring device, and the screen allocation is specified as a set 9 in a manner compatible with the monitoring device on which the conversion is to be performed. It is also specified in a record 507 that the UI 4 is to be used as the UI components. In other words, the UI 4 corresponds to the default resolution of the external monitoring device. The layout 3 can be obtained from the layout 1 by the user selecting the sub screen of the layout 1. Alternatively, the layout 3 can be obtained from the layout 1 or the layout 2 by automatically focusing a site being transmitting significant audio data.

The present embodiment can also provide a layout in which the sites are displayed in respective screen sizes different from one another. In other words, the participant at the site or the user who actually sees the screen of the monitoring device can define the type of layout for displaying the sites as appropriate. Furthermore, the participant or the user can define the number of other sites to be displayed at the single site and the display example thereof as appropriate.

The conversion processing of audio data according to the present embodiment will now be described. The main part of the conversion processing of audio data according to the present embodiment is tuning the output level to an output level of the external speaker. The conversion processing of audio data will be described with reference to FIG. 6. The processing is started at Step S600. It is detected that an external audio device is connected at Step S601. If no external audio device is connected, settings for the speaker and the microphone in the default settings of the information processor 101 are automatically selected. Recently, more information processors with high portability are designed to have an integrated external audio device, such as a microphone speaker. Furthermore, more information processors are designed to have an external monitor provided with a speaker. Therefore, if setting of the external audio device is not performed appropriately, interference may possibly occur between the microphone and the speaker. As a result, audio data fails to be input and output at an appropriate volume, thereby causing troubles frequently.

At Step S602, the system control unit 113 receives a class identification value (class ID) set by USB.org and an identification value, such as a product name, detected by the audio control unit 111. If the class ID is 01h, it is determined that an audio device is connected to the USB. Therefore, the system control unit 113 refers to a look-up table, which will be described later, to set parameters of a noise canceller, an echo canceller, automatic gain control (AGC), microphone boost, and the like so as to adjust to the output level of the detected external audio device, and transmit the parameters to the audio control unit 111. If the class ID is a value other than 01h, it is determined that a storage device is connected, for example. Therefore, the processing illustrated in FIG. 6 is stopped.

Subsequently, the system control unit 113 changes a parameter of a software amplifier to adjust a dynamic range of an audio parameter or the like at Step S603. Thus, the system control unit 113 sets the parameter of the audio device and transmits the set parameter to the audio control unit 111. The audio control unit 111 transmits a control signal to the externally connected microphone and speaker via the OS 106 and the USB controller 104, thereby enabling appropriate audio reproduction suitable for the external audio device. Subsequently, the processing illustrated in FIG. 6 is terminated at Step S604, and the system control goes to a control process subsequent thereto.

Figure 6:
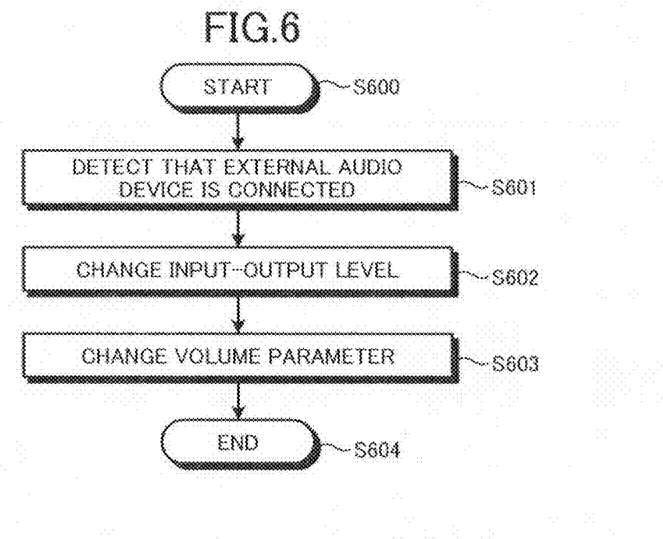
FIG. 6 is a flowchart of conversion processing of audio data according to the present embodiment.
Figure 7:
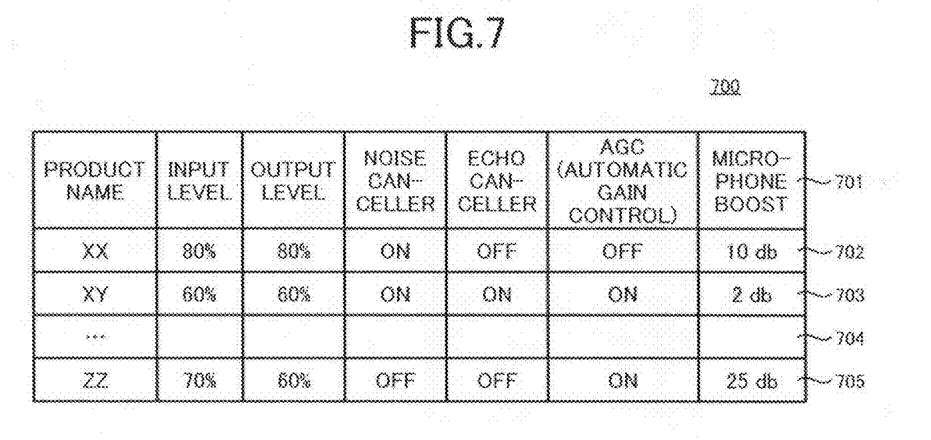
FIG. 7 is a schematic of an audio table serving as audio control information referred to in the processing illustrated in FIG. 6.

FIG. 7 is a schematic of an example of an audio table 700 serving as audio control information referred to in the processing illustrated in FIG. 6. In the audio table 700 of FIG. 7, various parameters are registered in a manner associated with product names, such as "XX" and "ZZ", as records 702 to 705. The system control unit 113 uses the audio table 700 illustrated in FIG. 7 to determine audio parameters to be output based on the value detected by the external audio connection detecting unit 109. In definition of the parameters, an input level indicates an attenuation factor of sensitivity for audio input from the microphone, whereas an output level indicates an attenuation factor of a volume of audio output from the speaker.

The noise canceller turns ON or OFF a function to remove noise generated when audio is output from the speaker. The echo canceller removes echo generated by hardware interference between the microphone and the speaker. The AGC performs ON-OFF control of a feedback function used for stabilizing output of the speaker. The microphone boost amplifies the volume of audio input from the microphone.

After making these settings, the system control unit 113 transmits audio data to the audio control unit 111. The audio control unit 111 then modulates the audio data in accordance with the settings. Subsequently, the audio control unit 111 outputs an analog signal corresponding to the audio data from the external speaker 117 via the OS 106 and the USB controller 104 in the present embodiment.

Figure 8:
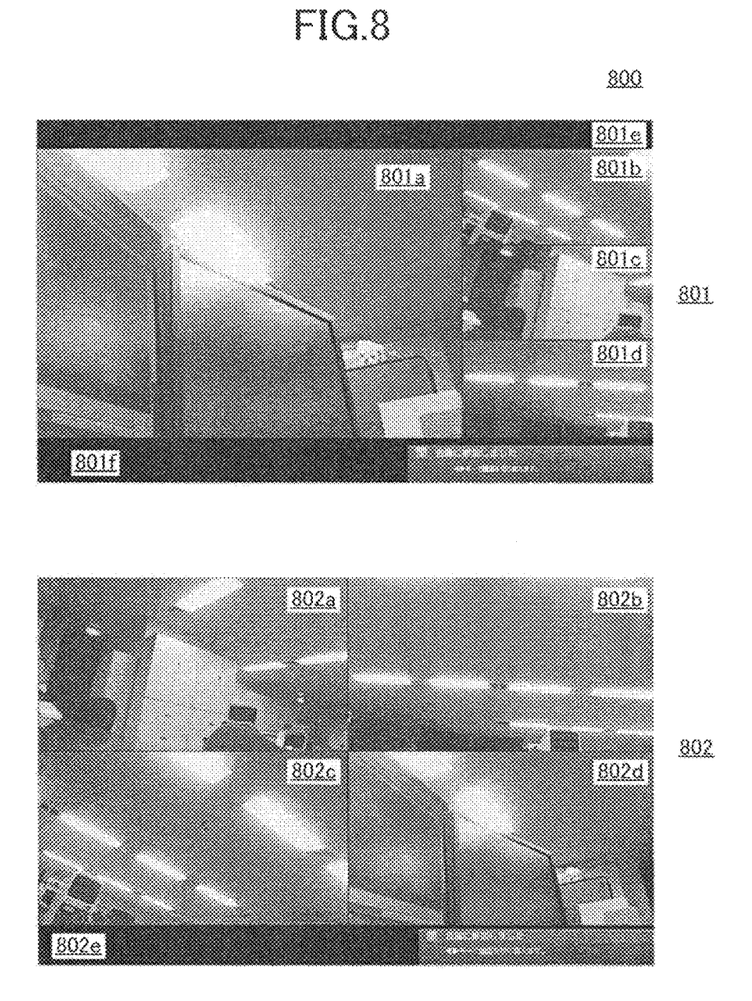
FIG. 8 is a view of a conference image 800 displayed on a screen of a second external monitoring device 115 according to the present embodiment.

FIG. 8 is a view of a conference image 800 displayed on a screen of the second external monitoring device 115 according to the present embodiment. A conference image 801 corresponds to the layout 1 in FIG. 5, whereas a conference image 802 corresponds to the layout 2. The layout 1 in the conference image 801 is preferably used to clearly display an image of a site attracting much attention when the screen resolution of the external monitoring device is relatively low, such as VGA and XGA, for example. The layout 2 in the conference image 802 may be used as default settings when the resolution of the external monitoring device is high enough to display clear images even on an evenly allocated screen.

As illustrated in FIG. 8, if there is a site determined to be a site attracting much attention by the system or a site on which the user put a focus, the image of the site can be displayed on a large screen as a screen 801a attracting much attention by shifting the screen configuration from the conference image 802 of the layout 2 to the conference image 801 of the layout 1. In this case, images 801b to 801d of the other sites may be displayed as the sub screens. The setting of the main screen and the sub screens of the conference image 801 can be arbitrarily changed by the system control unit 113 or selection made by the user as described above.

Areas 801e, 801f, and 802e are formed on the upper side and the lower side of the screen and remain in a state of displaying no image in association with the change of the screen resolution. In the present embodiment, the screen allocation attributes illustrated in FIG. 5 are set such that the divided images are displayed integrally as much as possible.

Figure 9:
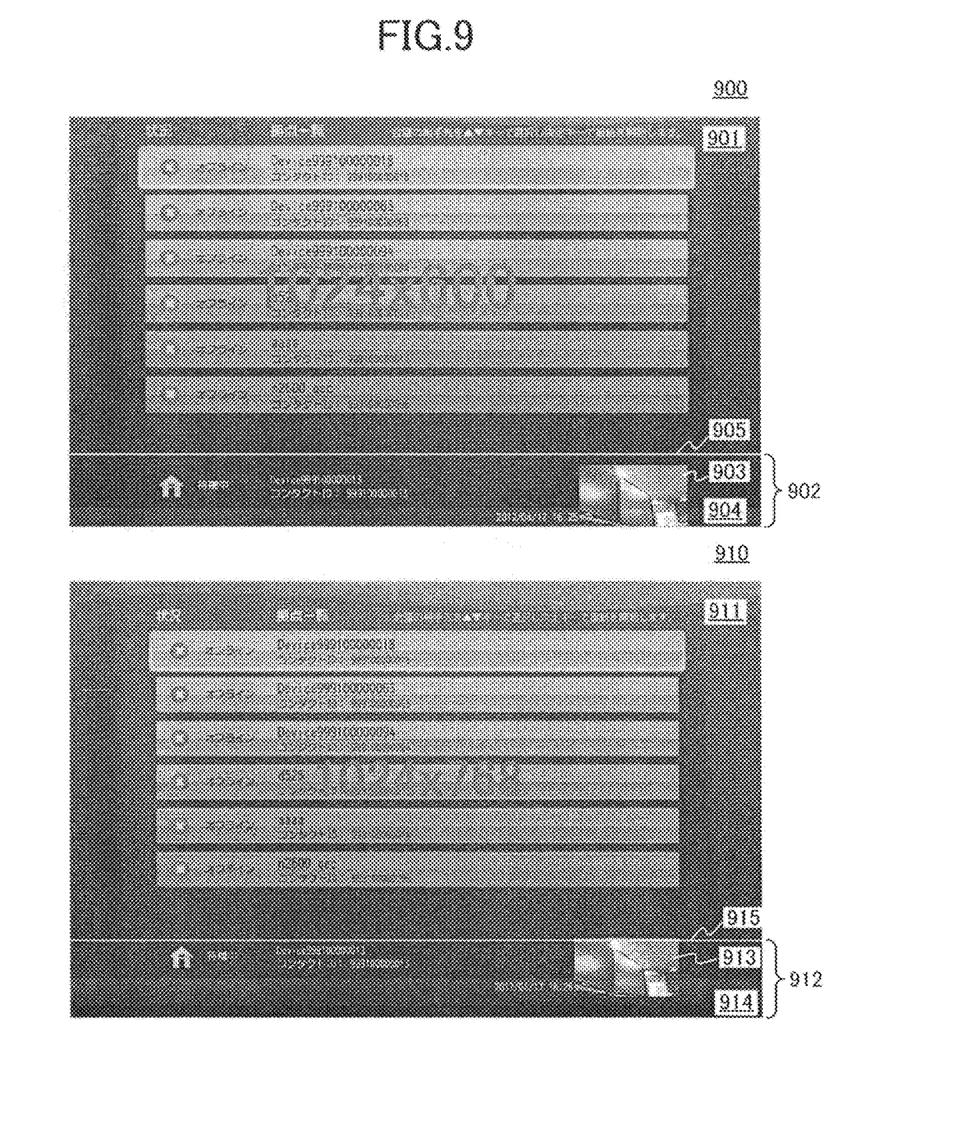
FIG. 9 is a schematic of a screen 900 serving as an example when a layout 3 in FIG. 5 is used according to the present embodiment.

FIG. 9 is a schematic of a screen 900 serving as an example when the layout 3 in FIG. 5 is used according to the present embodiment. In the example illustrated in FIG. 9, the layout 3 is used for displaying a menu screen when the full-screen of the external monitoring device is used to make various settings. A screen 901 is used when the resolution is low (WS-VGA), whereas a screen 911 is used when the resolution is higher (XGA). The screen 901 and the screen 911 are displayed in nearly the same size with respect to the entire screen. In the example illustrated in FIG. 9, the resolution can be changed simply by changing the UI components as explained with reference to FIG. 4. By adjusting a margin at the ends of the screen 901 and the screen 911 by the amount of change, a feeling of strangeness for the image is reduced. The screen 901 has a lower margin 902. The screen 901 effectively uses the margin to perform various types of display, thereby arranging the UI components.

Nearly the same configuration is employed for a screen 910. In association with the change in the resolution in the longitudinal direction, the width of a lower margin 912 is modified. In addition, by making the width of a layout frame 914 slightly wider (larger) than that of a layout frame 904 in the screen 901, an image providing no feeling of strangeness is generated. To effectively use the lower margins 902 and 912, graphics boxes that display sample images 903 and 913 are provided, respectively, in the example illustrated in FIG. 9. UI components can be selected and set as appropriate based on specific usage in addition to the objects illustrated in FIG. 9.

Figure 10:
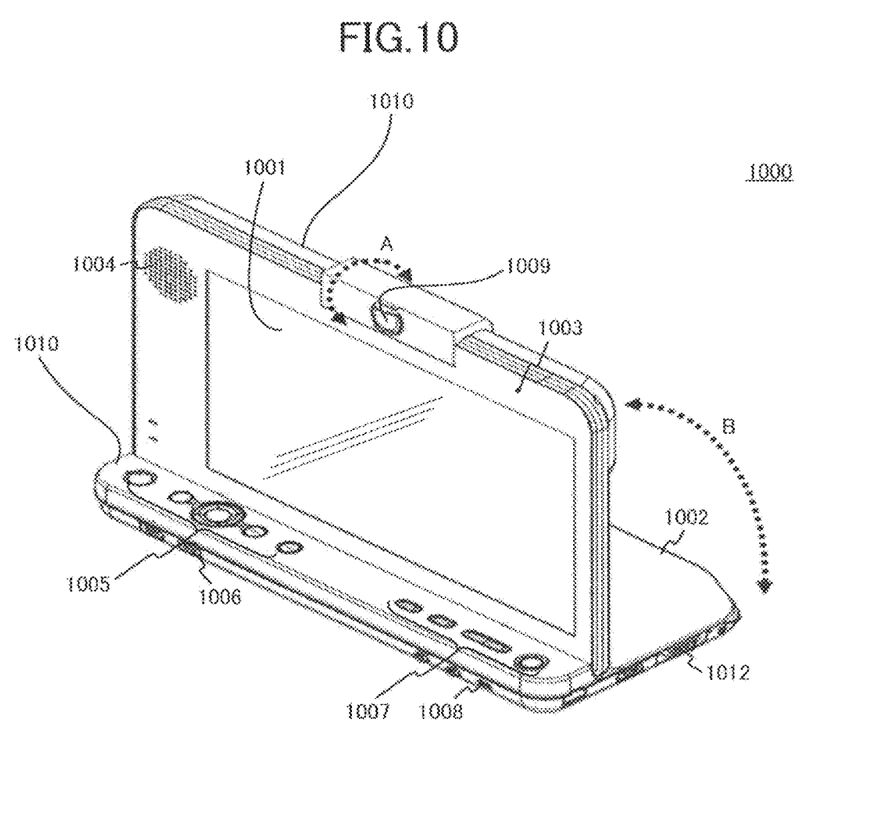
FIG. 10 is a schematic of a video conference terminal 1000 serving as a specific implemented example of an information processor 101 according to the present embodiment.

FIG. 10 is a schematic of a video conference terminal 1000 serving as a specific implemented example of the information processor 101 according to the present embodiment. The video conference terminal 1000 transmits AV data to the remotely placed server 118 (not illustrated) via an appropriate network infrastructure, such as Ethernet (registered trademark) or Wireless Fidelity (Wi-Fi). Thus, the video conference terminal 1000 can establish communications with another participant at a remote site.

The configuration of the video conference terminal 1000 will now be described in more detail. The video conference terminal 1000 includes a platform unit 1002 and an LCD panel unit 1010. The platform unit 1002 houses various functional units illustrated in FIG. 1. The LCD panel unit 1010 serving as an information display unit has a function to present various types of information to a participant. The platform unit 1002 and the LCD panel unit 1010 are connected with a hinge at an end portion of an interface unit 1011 formed on the platform unit 1002 in a manner slightly increasing the thickness. The LCD panel unit 1010 rotates about the hinge toward the platform unit 1002. If the LCD panel unit 1010 is moved along an arrow B until the LCD panel unit 1010 comes into contact with the platform unit 1002, the interface unit 1011 and the LCD panel unit 1010 are integrated with the platform unit 1002 in a manner eliminating difference in level.

The LCD panel unit 1010 includes a digital camera 1009, an LCD panel 1001, and a microphone 1003. The digital camera 1009 rotates in a direction of an arrow A to acquire an image desired by the participant. The LCD panel 1001 checks the image acquired by the digital camera 1009 and acquires moving image data of the participant. Furthermore, the LCD panel 1001 synchronizes audio data recorded by the microphone 1003 and the image to generate AV data in an appropriate compressed format, such as MPEG Audio Layer-3 (MP3), Moving Picture Experts Group 4 (MPEG-4), and High Definition 264 (HD264). The LCD panel 1001 then transmits the AV data to the server 118 via the network.

In another embodiment, the video conference terminal 1000 may transmit moving image data and audio data to the server 118 as RAW data without encoding the moving image data and the audio data. In this case, the server 118 synchronizes the moving image data and the audio data to generate AV data and transmits the AV data to a site of another participant. Thus, it is possible to establish communications therebetween. The LCD panel unit 1010 further includes a built-in speaker 1004. With this configuration, the LCD panel unit 1010 can reproduce and output audio obtained by decoding AV data transmitted from another participant independently.

The present embodiment can reduce a load, such as encoding, on the video conference terminal 1000 and transfer a processing load of the information processor 101, such as the video conference terminal 1000, to the server. Therefore, it is possible to reduce the cost and the weight of the information processor 101 and to enhance portability thereof.

The interface unit 1011 integrates input interface functions generally required for an assembly device such as the video conference terminal 1000. The interface unit 1011 has interface functions of a power key used for turning ON or OFF the power, a menu key used for displaying a menu, a cursor control key, a determination (corresponding to an Enter function) key, and a communication cutoff key, for example, integrally arranged as main control keys 1005. Furthermore, the interface unit 1011 has a camera switching key, an LCD luminance adjustment key, a volume adjustment key, and a volume mute key, for example, integrally arranged as functional control keys 1007.

The interface unit 1011 further includes a USB host connector 1006, an audio input-output terminal 1008, an HDMI connector 1012, and an RGB interface, for example. The interface unit 1011 can perform various types of input and output and control the input and output. As illustrated in FIG. 10, the video conference terminal 1000 has the minimum input-output function, and its input interface functions are not necessarily sufficient for making network settings and other various setting. Therefore, to improve the usability, the user may connect a USB keyboard and a mouse to the USB host connector. Furthermore, by connecting an external monitoring device and an audio device integrated with a monitoring device, it is possible to improve the input-output performance. The video conference terminal 1000 illustrated in FIG. 10 may be provided with a modular jack used for connecting the video conference terminal 1000 to Ethernet (registered trademark), which is not illustrated.

To connect an external monitoring device, the video conference terminal 1000 is provided with an interface, such as RGB, digital visual interface (DVI), and HDMI, used for connecting an external display. In the present embodiment, by connecting an external device that allows a number of people at the site of the participant to share an image of another site, the usability of the video conference terminal 1000 is improved.

When the external monitoring device is prepared for each site, it is not realistic to assume that all the monitoring devices are the same model with the same model number. Therefore, if the information processor 101 according to the present embodiment detects an external monitoring device and an externally connected speaker connected to the information processor 101 in a plug-in and play system, the system control unit 113 of the information processor 101 automatically sets a graphics environment and an audio environment. Thus, the system control unit 113 performs control that enables a conference to proceed efficiently without providing a feeling of strangeness.

In the present embodiment, an assumption is made that an external input device is connected. Even under the condition that an externally connected device is connected, the information processor 101 functioning as an assembly device automatically controls an output environment. Thus, it is possible to achieve smooth establishment of a conference.

Figure 11:
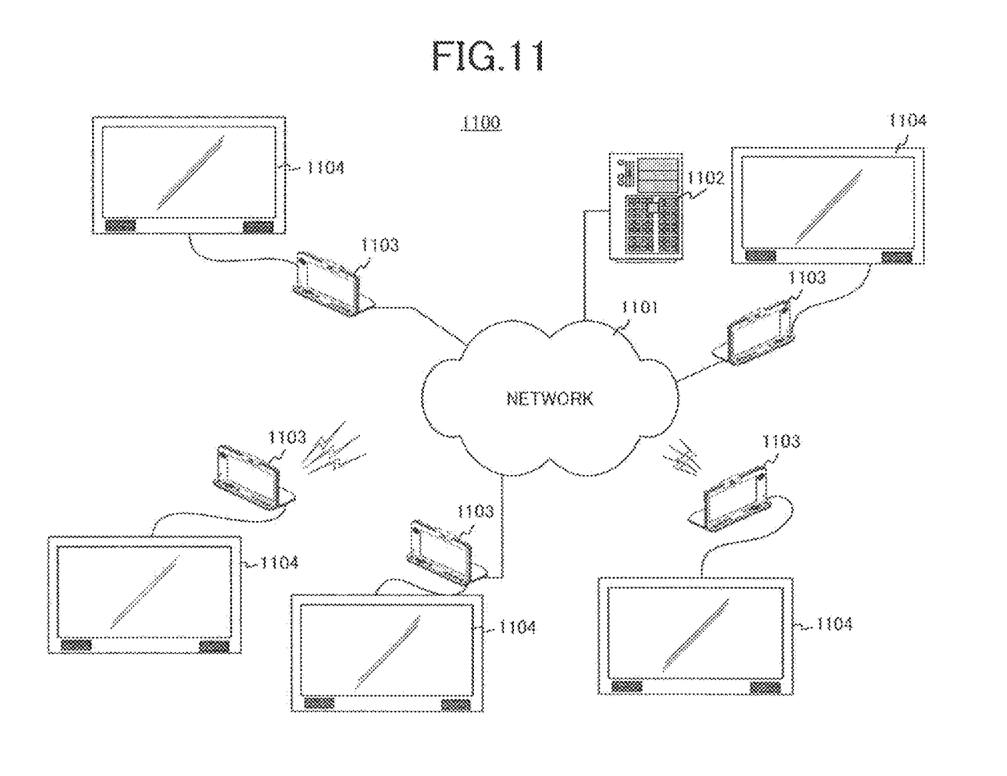
FIG. 11 is a schematic of a video conference system 1100 according to the present embodiment.

FIG. 11 is a schematic of a video conference system 1100 according to the present embodiment. The video conference system 1100 illustrated in FIG. 11 is formed of a plurality of video conference terminals 1103 connected to one another via a network 1101. Furthermore, an external monitor 1104 in conformity with a standard, such as RGB, DVI, and HDMI, is connected to each of the video conference terminals 1103, thereby expanding the function of the video conference terminals 1103. Data acquired by the video conference terminal 1103 is transmitted to a server 1102 by wireless communications, such as Wi-Fi, in accordance with a communication protocol, such as Ethernet (registered trademark) and IEEE 802.11. The data is encoded into AV data as appropriate and transmitted to the video conference terminal 1103 of each participant by streaming distribution, for example.

Because the video conference terminal 1103 that receives the AV data has already adjusted the graphics environment and the audio environment in the previous setting according to the present embodiment, the video conference terminal 1103 promptly decodes the AV data. The video conference terminal 1103 then displays a decoded image on the LCD panel 1001 or the external monitoring device 1004 and reproduces and outputs audio data from the microphone. Thus, it is possible to establish communications among participants at remote sites from one another.

In the video conference system illustrated in FIG. 11, the external input device is connected, and the video conference terminal 1003 automatically controls the output environment regardless of the output environment at the site where the video conference terminal is placed. As a result, the video conference system 1100 can be smoothly introduced. Therefore, it is possible to efficiently start operations without generating an excessive load on the server 1102.

While certain embodiments of the present invention have been described, the present invention is not limited to a video conference terminal. The present invention can be employed to improve a limited input environment of an information processor that essentially gives priority to its portability, such as a smartphone and a tablet personal computer (PC). The present invention is not limited to these embodiments and may be embodied in a variety of other embodiments conceivable by those skilled in the art. Furthermore, various addition and changes may be made without departing from the scope and spirit of the present invention.

The embodiment changes a screen layout of a video device that specifies the position and the size of video displaying each site depending on the magnitude of resolution of the video device. As a result, it is possible to automatically prevent troubles on the image from occurring, such as smaller resolution making it hard to see the video and larger resolution excessively increasing the video size. Furthermore, it is also possible to control the minimum value of a network bandwidth for reproducing the video depending on the image resolution and a change in the screen layout.

The embodiment can store an input-output level of an audio device to automatically set an audio output level corresponding to an output environment of a detected audio device. As a result, it is possible to reproduce and output an audio visual signal (hereinafter, referred to as an AV signal) including a visual signal and an audio signal while fully exercising the capacity of an external input-output device without putting a burden on the eyes and ears of the user. Furthermore, it is also possible to prevent an interference environment from occurring, such as feedback caused between an external microphone and a speaker.

Furthermore, the embodiment can provide an information processing method and a computer program executed by the information processor.

The embodiment can provide an information processor, an information processing method, and a computer program that makes it possible to flexibly support an output device and output video while fully exercising the capacity of the output device without putting a burden on the eyes and ears of a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a storage that stores therein output control information used for setting an output environment of an external output device which is a video display device, the output control information includes screen layout information used for performing control relating to a pre-configured resolution of the video display device, wherein a single screen is divided into a plurality of screens to perform integrated display on the single screen, the screen layout information indicating how to arrange and display the plurality of screens to be displayed at the external output device when multipoint connection is established for a video conference, the screen layout information indicating a first screen layout in which one of the plurality of screens is displayed larger than the remaining screens when the video display device has a first pre-configured resolution, and the screen layout information indicating a second screen layout in which the plurality of screens are displayed at a same size when the video display device has a second pre-configured resolution that is higher than the first pre-configured resolution; and
processing circuitry configured to
acquire information indicating the output environment of the external output device when the external output device is connected to the information processing apparatus;
determine the acquired output environment by referring to the output control information stored in the storage; and
operate the external output device in accordance with the determined output environment;
acquire a moving image and synchronize the moving image with audio data; and
modify a network bandwidth for a display of the moving image with audio data.

2. The information processing apparatus according to claim 1, wherein the output control information includes object information used for a graphical user interface corresponding to a pre-configured resolution of a video display device.

3. The information processing apparatus according to claim 1, wherein
the external output device further includes an audio device, and
the output control information includes audio control information used for operating the audio device detected.

4. A non-transitory computer-usable medium having computer-readable program codes embodied in the medium, wherein the program codes when executed cause a computer to perform a method comprising:
acquiring information indicating the output environment of an external output device, which is a video display device, when the external output device is connected to the computer, the output control information includes screen layout information used for performing control relating to pre-configured resolution of the video display device;
determining the output environment acquired at the acquiring by referring to a storage that stores therein output control information used for setting the output environment of the external output device;
operating the external output device in accordance with the determined output environment;
acquiring a moving image and synchronizing the moving image with audio data;
modifying a network bandwidth for a display of the moving image with the audio data; and
dividing a single screen into a plurality of screens to perform integrated display on the single screen, the screen layout information indicating how to arrange and display the plurality of screens to be displayed at the external output device when multipoint connection is established for a video conference, the screen layout information indicating a first screen layout in which one of the plurality of screens is displayed larger than the remaining screens when the video display device has a first pre-configured resolution, and the screen layout information indicating a second screen layout in which the plurality of screens are displayed at a same size when the video display device has a second pre-configured resolution that is higher than the first pre-configured resolution.

5. The non-transitory computer-usable medium according to claim 4, wherein the external output device further includes an audio device, and the output control information further includes audio control information used for operating the audio device.

6. An information processing method to operate an external output device in accordance with an output environment other than a default setting of an information processing apparatus, the information processing method causing the information processing apparatus to perform:

acquiring information indicating the output environment of the external output device, which is a video display device, when the external output device is connected to the information processor, the output control information includes screen layout information used for performing control relating to a pre-configured resolution of the video display device;

determining the output environment acquired at the acquiring by referring to a storage that stores therein output control information used for setting the output environment of the external output device;

operating the external output device in accordance with the determined output environment;

acquiring a moving image and synchronizing the moving image with audio data;

modifying a network bandwidth for a display of the moving image with the audio data; and dividing a single screen into a plurality of screens to perform integrated display on the single screen, the screen layout information indicating how to arrange and display the plurality of screens to be displayed at the external output device when multipoint connection is established for a video conference, the screen layout information indicating a first screen layout in which one of the plurality of screens is displayed larger than the remaining screens when the video display device has a first pre-configured resolution, and the screen layout information indicating a second screen layout in which the plurality of screens are displayed at a same size when the video display device has a second pre-configured resolution that is higher than the first pre-configured resolution.

7. The information processing method according to claim 6, wherein the external output device further includes an audio device, and the output control information further includes audio control information used for operating the audio device.

* * * * *